United States Patent Office 3,079,298
Patented Feb. 26, 1963

3,079,298
INSECT REPELLENT COMPOSITION
Lyle D. Goodhue, Bartlesville, and Kenneth E. Cantrel, Dewey, Okla., assignors to Phillips Petroleum Company, a corporation of Delaware
No Drawing. Filed May 10, 1960, Ser. No. 27,998
11 Claims. (Cl. 167—33)

This invention relates to a novel insect repellent composition. It also relates to a novel method of repelling an insect. In one of its aspects, the invention relates to an insect repellent composition essentially comprising at least one of a group of repellent compounds and an inorganic compound selected from the group consisting of sodium sulfite, sodium molybdate, ammonium bisulfate, zinc sulfate, potassium aluminum sulfate, ammonium sulfate, ammonium persulfate, zinc borate, sodium sulfate, calcium chloride, and sodium iodide. In another of its aspects, the invention relates to a method for the repelling of insects, especially roaches, by applying to the place at which the insects are undesired a composition according to the invention as herein described.

Although insecticides have been used for many years to combat these pests, the field of insect repellents is receiving a great deal of attention. In many instances, it is highly desirable to keep insects from frequenting a certain location rather than having to kill these insects in that place.

Insect repellents have been discovered recently which are particularly effective in repelling flies and roaches, such as the dialkyl esters of pyridine dicarboxylic acids, polycyclic aldehydes, polycyclic alcohols, and various sulfoxide compositions. In U.S. Patent 2,884,355, it is disclosed that N-alkyl imides of bicyclo[2.2.1]-5-heptene-2,3-dicarboxylic acid, the alkyl 3-(3,4-methylenedioxybenzene)propyl sulfoxides and certain substituted methylenedioxybenzenes greatly extend the repellent life of dialkyl esters of pyridine dicarboxylic acids. Also, it is disclosed in copending application Serial No. 467,882 of L. D. Goodhue et al., filed November 9, 1954, presently allowed, now U.S. Patent No. 2,919,227, that certain polycyclic compounds prepared by the reaction of one mol of furfural with two mols of butadiene are synergized by combination with N-alkyl imides of bicyclo[2.2.1]-5-heptene-2,3-dicarboxylic acid. These binary repellents which contain said polycyclic compounds are excellent repellents for such insects as stable flies and roaches. It is desirable to lengthen their repellent life.

It is an object of this invention to provide an insect repellent composition. It is another object of this invention to provide a method for repelling insects. It is a further object of this invention to lengthen the life of an insect repellent composition. It is a further object of this invention to provide a method of repelling insects which includes applying to a place from which the insect is to be repelled, a composition having a relatively long period of repellent effectiveness. Another object of this invention is to provide an insect repellent composition having a repellent life sufficiently long so that packages employed by manufacturers will be repellent to insects for the normal length of time required for transportation, vending and consuming the products therein.

Other aspects, objects and the several advantages of the invention are apparent from a study of this disclosure and the claims.

It is now discovered that compositions containing certain insect repellents such as a polycyclic aldehyde or alcohol, a stabilizer or synergist such as an N-alkyl bicyclo[2.2.1]-5-heptene-2,3-dicarboximide and a finely divided inorganic material selected from the group consisting of sodium sulfite, sodium molybdate, ammonium bisulfate, zinc sulfate, potassium aluminum sulfate, ammonium sulfate, ammonium persulfate, zinc borate, sodium sulfate, calcium chloride, and sodium iodide are very effective repellents, particularly for roaches, and have an extremely long repellent life.

The terminology "polycyclic aldehyde and alcohol" as used herein is intended to include compounds of the formulas

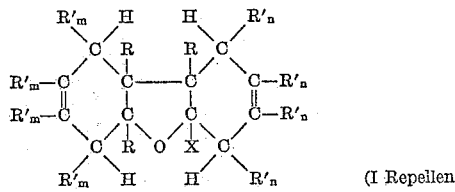

and

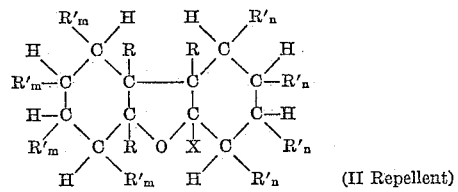

wherein X is selected from the group consisting of

and

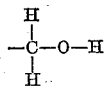

R is selected from the group consisting of hydrogen and methyl, wherein at least one R is hydrogen, wherein each R' is a radical selected from the group consisting of hydrogen and alkyl radicals containing not more than 3 carbon atoms, wherein the sum of the carbon atoms in the $R'_n$ and $R'_m$ radicals is in each case not greater than 3, and wherein at least two of the $R'_m$ and at least two of the $R'_n$ radicals are hydrogen.

Some examples of compounds of the above general formulas which can be employed are: 2,3,4,5-bis($\Delta^2$-butenylene)tetrahydrofurfural; 2,3,4,5-bis-($\Delta^2$-butenylene)-tetrahydrofurfuryl alcohol; 2,3,4,5-bis(butylene)tetrahydrofurfural; 2,3,4,5-bis(butylene)tetrahydrofurfuryl alcohol; 2,3,4,5 - bis($\Delta^2$-2-methylbutenylene)tetrahydrofurfural; 2,3,4,5-bis(2,3-dimethylbutylene)tetrahydrofurfural; 2,3,4,5 - bis(2 - ethylbutylene)tetrahydrofurfural; 2,3($\Delta^2$-methylbutenylene) - 4,5 - ($\Delta^2$ - 2-ethylbutenylene)tetrahydrofurfural; 2,3-(2,3-dimethylbutylene)-4,5-(2-methylbutylene)tetrahydrofurfural; 2,3,4,5-bis($\Delta^2$-2-methylbutenylene)tetrahydrofurfuryl alcohol; 2,3,4,5-bis(2-ethylbutylene)tetrahydrofurfuryl alcohol and 2,3-($\Delta^2$-butenylene)-4,5-($\Delta^2$-2-methylbutenylene)tetrahydrofurfuryl alcohol.

Methods for preparing these compounds are set forth in detail in U.S. Patents 2,683,151; 2,687,419 and 2,795,592.

The following repellents can also be employed in conjunction with the inorganic materials according to the method of this invention. One group of repellents includes the dialkyl esters of pyridine dicarboxylic acids of the formula

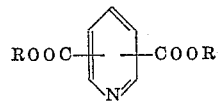

(III Repellent)

wherein each R is the same alkyl radical selected from the group consisting of ethyl, n-propyl and n-butyl. Some examples of compounds falling within the scope of this formula are di-n-propyl pyridine-2,5-dicarboxylate, diethyl pyridine-2,5-dicarboxylate, di-n-propyl pyridine-2,6-dicarboxylate, di-n-butyl pyridine-2,4-dicarboxylate, and the like. A more complete description of these repellents can be found in U.S. 2,757,120 of Leonard, issued July 31, 1956.

Still another group of repellents which can be employed in the compositions of this invention includes those of the formula

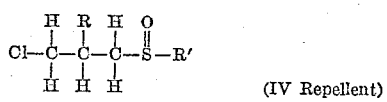
(IV Repellent)

wherein R is selected from the group consisting of hydrogen and methyl and R' is selected from the group consisting of normal, secondary and tertiary octyl groups. Compounds included within this formula are 3-chloropropyl n-octyl sulfoxide, 3-chloropropyl sec-octyl sulfoxide, 3-chloropropyl tert-octyl sulfoxide, 2-methyl-3-chloropropyl n-octyl sulfoxide, 2-methyl-3-chloropropyl sec-octyl sulfoxide and 2-methyl-3-chloropropyl tert-octyl sulfoxide. A more complete description of the sulfoxides of this invention is given in the copending application of R. E. Stansbury et al., Serial No. 733,834, filed May 8, 1958, now U.S. Patent No. 2,944,932.

Still another class of repellents which can be employed in the compositions of this invention includes those of the formula

(V Repellent)

wherein $R_1$ is an unsaturated alicyclic or acyclic hydrocarbon radical having 3 to 10 carbon atoms and having one of an ethylenic and an acetylenic bond and wherein $R_2$ can be the same as $R_1$ and can be one of any saturated and unsaturated aliphatic and alicyclic organic radicals having 3 to 20 carbon atoms and $R_2$ in which a hydrogen atom is replaced by

and wherein the total number of carbon atoms in the compound is at least 6 and does not exceed 30. The preferred compounds falling within the scope of this formula are allyl n-octyl sulfoxide and methylallyl n-octyl sulfoxide. A description of these repellents and a complete list of specific examples of these repellents is given in the copending application of L. D. Goodhue et al., Serial No. 753,188, filed August 5, 1958, now U.S. Patent No. 3,000,779.

A still further class of repellents which can be employed in the composition of this invention includes those of the formula

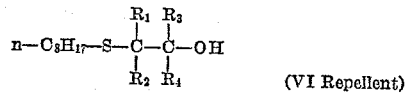
(VI Repellent)

wherein $R_1$, $R_2$, $R_3$ and $R_4$ can be hydrogen, methyl, ethyl, propyl, isopropyl, or n-, iso- or tert-butyl radicals in any combination such that the total number of carbon atoms in $R_1$, $R_2$, $R_3$ and $R_4$ does not exceed 4. Some specific examples of compounds within this formula are 2-hydroxyethyl n-octyl sulfide, 2-hydroxypropyl n-octyl sulfide and 2-methyl-2-hydroxypropyl n-octyl sulfide. A more complete description of this class of repellents is given in U.S. 2,863,799 of L. D. Goodhue et al., issued December 9, 1958.

Still another class of repellents which can be employed in the compositions of this invention as repellents includes those of the formula

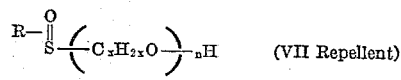
(VII Repellent)

wherein R is a radical selected from the group consisting of alkyl, aryl, alkaryl, aralkyl, and cycloalkyl radicals containing from 4 to 16 carbon atoms, $x$ is an integer not less than 2 and ordinarily, though not necessarily, not greater than 5, and $n$ is an integer from 1 to 10. Some representative examples of compounds of this type are 2-hydroxyethyl n-octyl sulfoxide, 17-hydroxy-3,6,9,12,15-pentaoxaheptadecyl tert-dodecyl sulfoxide, 2-hydroxyethyl tert-nonyl sulfoxide, 2-hydroxyethyl tert-dodecyl sulfoxide, 2-hydroxyethyl tert-dodecyl sulfoxide, 8-hydroxy-3,6-dioxaoctyl tert-dodecyl sulfoxide, 2-hydroxyethyl n-butyl sulfoxide, and the like. A complete listing of the compounds within this general formula is given in the copending application of J. E. Mahan, Serial No. 679,054, filed August 19, 1957, now U.S. Patent No. 2,926,118.

Still another class of repellents which can be employed in the compositions of this invention includes those falling within the formula

(VIII Repellent)

wherein $R_3$ is an n-alkyl radical having 1 to 12 carbon atoms, $R_4$ is a radical selected from the group consisting of n- and sec-alkyl radicals having 1 to 8 carbon atoms, and wherein the total carbon atoms in $R_3$ and $R_4$ is in the range from 7–13 inclusive. Some specific examples of compounds falling within the scope of this formula are n-butyl n-propyl sulfoxide, n-octyl n-propyl sulfoxide and n-butyl n-hexyl sulfoxide. A more complete list of compounds of this type is given in the copending application of L. D. Goodhue et al., Serial No. 661,584, filed May 27, 1957, now U.S. Patent No. 2,957,799.

The N - alkyl bicyclo[2.2.1] - 5 - heptene - 2,3 - dicarboximides which can be employed in the insect repellent compositions of this invention are represented by the formula

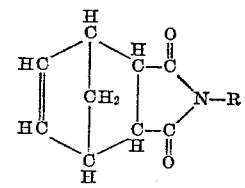
(IX Synergist)

wherein R is an alkyl radical containing from 1 to 12 carbon atoms, preferably from 4 to 10 carbon atoms. While the most preferred compound is when R is 2-ethylhexyl, other imides wherein R is, for example, methyl, ethyl, n-propyl, tert-butyl, isohexyl, n-octyl, sec-decyl and tert-dodecyl, are within the scope of this invention.

Other materials which have shown a synergistic effect in prolonging the repellent life of certain repellents are the sulfoxide of isosafrole, represented by the formula

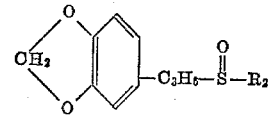
(X Synergist)

wherein $R_2$ is an alkyl radical containing from 2 to 12 carbon atoms; and substituted methylenedioxybenzenes, represented by the formula

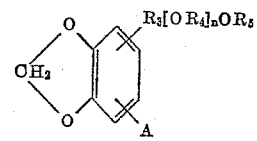
(XI Synergist)

where A is hydrogen or an alkyl radical containing 1 to 6 carbon atoms, $R_3$ and $R_4$ are bivalent paraffin radicals containing 1 to 3 carbon atoms, $R_5$ is an alkyl or cycloalkyl radical containing from 1 to 12 carbon atoms, and $n$ is an integer from 1 to 3.

Examples of alkyl 3-(3,4-methylenedioxybenzene)propyl sulfoxides include ethyl 3-(3,4-methylenedioxybenzene)propyl sulfoxide and n-octyl 3-(3,4-methylenedioxybenzene)propyl sulfoxide.

Examples of substituted methylenedioxybenzenes include 1-[2,5,8-trioxadodecyl] - 2 - propyl-4,5-methylenedioxybenzene; and 1 - [4,7,10-trimethyl-2,5,8,11 - tetraoxanonadecyl]-3-n-propyl-4,5-methylenedioxybenzene.

The above synergistic materials are described more fully in Patent No. 2,884,355, issued April 28, 1959, to L. D. Goodhue and K. E. Cantrel.

The above synergistic materials may exhibit some repellent properties; however, they are not considered satisfactory repellents for most purposes and are herein distinguished from the repellent compositions per se by reference thereto as organic synergists.

The fact that the finely divided inorganic materials of the invention are operative to increase the repellent life of the recited compositions is surprising. This is so because the phenomenon is not universally true. The property or properties of the inorganic material which may be responsible for the action which has been discovered are not now recognized as being involved.

Also, according to the invention, there is provided a method of repelling an insect, for example, a fly or a roach, by applying to the place from which the insect is to be repelled a composition according to the invention.

The finely divided adsorbents are preferably within the particle size range of about 1 to 10 microns and are usually employed in the amount of about 0.25 to about 4 parts per part by weight of repellent.

The organic synergists previously defined are preferably utilized in conjunction with the active repellent ingredient and the inorganic synergists repellent life extenders; however, the inorganic compounds alone greatly extend the repellent life of the insect repellents disclosed herein and can be utilized alone with those repellents. The mechanism by which the repellent life of the active repellent ingredient is extended is not known although it is believed that the mechanism of repellent life increase bestowed upon the repellent by the compounds of U.S. Patent 2,884,355 differs from that of the finely divided inorganic materials of this invention.

It is possible, and sometimes desirable, to employ mixtures of two or more of the repellents from a single class or from different classes with one or both of the synergistic materials and inorganic compounds disclosed herein. Thus, the above-described repellents can be employed in conjunction with the inorganic compounds alone although it is preferred to utilize them in conjunction with one of the synergists disclosed in U.S. Patent 2,884,355.

The ingredients of the repellent compositions can be simply mixed together and employed in that form; however, it is usually preferred to suspend such mixture in a carrier for ease of application and efficient use of the repellent composition. The repellent compositions of this invention will usually be used in the form of emulsions comprising an oil phase, a water phase and an emulsifier. The oil phase can be any hydrocarbon solvent which is not detrimental to the active repellent material. Some examples of materials which can be employed are: deodorized kerosene, benzene, toluene, isooctane, and the isoparaffinic hydrocarbons boiling between 250 and 800° F. which are prepared by the HF-catalyzed alkylation of isoparaffins with olefins and sold under the trademark Soltrols. Any emulsifying agent can be employed which does not adversely affect the repellent materials. One skilled in the art will experience no difficulty in selecting an emulsifying agent which will suit his particular requirements. Emulsifying agents such as sulfonated alkyl benzenes, alkylated aryl polyether alcohols such as Triton X-100; alkali metal alkyl aryl sulfonates such as sodium and potassium alkylbenzene sulfonates and potassium alkyltoluene sulfonates; sulfates of long-chain aliphatic alcohols such as sodium lauryl sulfates; water-soluble salts of organic bases containing a hydrocarbon chain of 8 to 24 carbon atoms, such as hydrochloric, sulfonic, formic, and acetic acid salts of primary, secondary and tertiary amines such as octyl amines, dodecyl amines, octadecyl amines, and octadecenyl amines; the non-ionic emulsifying agents such as the condensation products of mercaptans with ethylene oxide; sorbitan monolaurate; and sorbitan monolaurate polyoxyethylene derivatives such as Tween 20 can be used, as well as the Emcol H44C of Example I.

The compositions of this invention will contain repellent, organic synergist and inorganic compound in the ratios from 0 to 20 parts by weight of organic synergist and from 0.2 to 10 parts by weight of inorganic compound per part of repellent. When the repellent compositions are applied in carriers such as solvents, the repellent will be present in the composition in an amount within the range between 0.5 and 20 percent by weight based on the carrier.

The final composition of the emulsions of this invention will be within the following range:

REPELLENT COMPOSITION

| | Figures in weight percent |
|---|---|
| Oil | 5–20 |
| Organic synergist | 0–10 |
| Emulsifier | 1–5 |
| Repellent | 0.5–5 |
| Inorganic compound | 1–5 |
| Water | 55–92.5 |

The ratio of the organic synergist to the repellent will be within the range of from 0 to 20:1, preferably from 5:1 to 1:1, both ratios being on a weight basis.

The method of formulating the emulsions of this invention has a direct bearing on the effectiveness of the composition. The preferred method is to dissolve the organic synergist, the emulsifier and the repellent in the oil, slurry the inorganic compound in the water, and then emulsify the two phases together.

After the composition is formulated, the emulsion can be applied to surfaces from which it is desired to repel insects by such methods as spraying, dipping, brushing, and the like. It is generally advantageous to apply a sufficient amount of the repellent composition to the surface to be treated so as to deposit from 1 to 500 grams of the repellent per 100 square feet of surface.

The following specific example clearly demonstrates the effectiveness of the repellent compositions of this invention. However, it is not intended that the invention be limited to the specific embodiments shown therein.

*Examples*

A number of runs was carried out in which mixtures of 2,3,4,5-bis($\Delta^2$-butenylene)tetrahydrofurfural and N-2-ethylhexyl bicyclo[2.2.1]-5-heptene-2,3-dicarboximide were tested alone and in mixtures with finely divided inorganic compounds as repellents for roaches.

In these tests, one part by weight of a concentrate which contained 68 percent by weight deodorized kerosene, 15 percent by weight N-2-ethylhexyl bicyclo[2.2.1]-5-heptene-2,3-dicarboximide, 5 percent by weight 2,3,4,5-bis($\Delta^2$-butenylene)tetrahydrofurfural and 12 percent by weight of a non-ionic detergent sold under the trade name of Emcol H44C by the Emulsol Corporation of Chicago, Illinois, was mixed with 4 parts by weight of an aqueous solution containing 2.5 weight percent of one of the inorganic compounds of this invention, or in a control run, 4 parts of water.

The thus-prepared emulsions, containing 1 percent by weight 2,3,4,5-bis($\Delta^2$-butenylene)tetrahydrofurfural, 3 percent by weight N-2-ethylhexyl bicyclo[2.2.1]-5-heptene-2,3-dicarboximide, and 0 or 2 percent by weight of one of the inorganic compounds, were then applied to file cards, 3″ x 5″. A total of five cards, including one untreated check, was placed in clear plastic cages, 8″ x 8″ x 12″, fitted with a screened top, and containing approximately 500 German roaches. The cards were placed so as to lean against the sides of the cage. If all five cards were non-repellent, each card would thus have approximately 100 roaches on it, since these roaches crawl up on the cards. In these tests, wherein only one card was non-repellent at the beginning of the test, the check contained about 150 roaches.

Prior to introduction of the cards, the cards were treated with the emulsions by dipping the cards in five cc. of liquid, and hung up in the laboratory for 1 week. The cards were then introduced and six counts of the roaches on each card were made at one-hour intervals. The cards were then removed and aged another week and again exposed to the roaches. The procedure was repeated at the end of the third and fourth weeks, at which time the tests were discontinued. The percent repellency at the end of each week was calculated by the following formula:

Percent repellency
$$=100-\frac{\text{Total roaches on treated card} \times 100}{\text{Total roaches on untreated card}}$$

The results of these tests are expressed as Table I.

TABLE I

| Inorganic Compound Added | Percent repellency | | | |
|---|---|---|---|---|
| | One week | Two weeks | Three weeks | Four weeks |
| Sodium sulfite | 93 | 61 | 68 | (1) |
| Sodium molybdate | 84 | 23 | 55 | (1) |
| Ammonium bisulfate | 83 | 30 | 59 | (1) |
| Zinc sulfate | 89 | 49 | 77 | (1) |
| Potassium aluminum sulfate | 95 | 78 | 84 | 63 |
| Ammonium sulfate | 86 | 62 | (1) | 19 |
| Ammonium persulfate | 49 | 88 | 58 | 41 |
| Zinc borate | 71 | 89 | 78 | 39 |
| Sodium sulfate | 71 | 92 | 77 | 41 |
| Calcium chloride | 95 | 66 | 63 | 36 |
| Sodium iodide | 83 | 78 | (2) | 58 |
| None [3] | 56 | 51 | 47 | 1 |
| None [3] | 77 | 61 | 48 | (2) |

[1] Not determined.
[2] Negative—More roaches were present on the treated card in this run than the untreated check. By use of the formula for the determination of percent repellency, this yields a negative figure.
[3] In these runs, the compositions tested contained 1 percent by weight of 2,3,4,5-bis ($\Delta^2$-butenylene)tetrahydrofurfural, 3 percent by weight of N-2-ethylhexyl bicyclo[2.2.1]-5-heptene-2,3-dicarboximide and 0 weight percent of an inorganic compound.

Reasonable variation and modification are possible within the scope of the foregoing disclosure and the appended claims to the invention, the essence of which is that at least one repellent compound having structural characteristics as set forth at I–VIII, preferably but not necessarily in composition with a compound having structural characteristics as set forth at IX–XI, is combined with at least one of the inorganic compounds specifically set forth herein providing an improved repellent composition having an extended life over that of the repellent compound used alone.

We claim:

1. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and a compound selected from a group consisting of Sodium sulfite
Sodium molybdate
Ammonium bisulfate
Potassium aluminum sulfate
Ammonium sulfate
Ammonium persulfate
Zinc borate
Sodium sulfate
Calcium chloride, and
Sodium iodide in a quantity sufficient to extend effectively the life of the composition of the two first-mentioned compounds, said repellent being present in a concentration in the neighborhood of about 1 percent, said synergist being present in a concentration in the neighborhood of about 3 percent, and said last-mentioned compounds being present in an amount in the neighborhood of about 2 percent, the concentrations being expressed in weights percent.

2. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and sodium sulfite in a quantity sufficient to extend effectively the life of the composition of the two first-mentioned compounds, said repellent being present in a concentration in the neighborhood of about 1 percent, said synergist being present in a concentration in the neighborhood of about 3 percent, and said sodium sulfite being present in an amount in the neighborhood of about 2 percent, the concentrations being expressed in weights percent.

3. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and sodium molybdate in a quantity sufficient to extend effectively the life of the composition of the two first-mentioned compounds, said repellent being present in a concentration in the neighborhood of about 1 percent, said synergist being present in a concentration in the neighborhood of about 3 percent, and said sodium molybdate being present in an amount in the neighborhood of about 2 percent, the concentrations being expressed in weights percent.

4. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and ammonium bisulfate in a quantity sufficient to extend effectively the life of the composition of the two first-mentioned compounds, said repellent being present in a concentration in the neighborhood of about 1 percent, said synergist being present in a concentration in the neighborhood of about 3 percent, and said ammonium bisulfate being present in an amount in the neighborhood of about 2 percent, the concentrations being expressed in weights percent.

5. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and potassium aluminum sulfate in a quantity sufficient to extend effectively the life of the composition of the two first-mentioned compounds, said repellent being present in a concentration in the neighborhood of about 1 percent, said synergist being present in a concentration in the neighborhood of about 3 percent, and said potassium aluminum sulfate being present in an amount in the neighborhood of about 2 percent, the concentrations being expressed in weights percent.

6. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and ammonium sulfate in a quantity sufficient to extend effectively the life of the composition of the two first-mentioned compounds, said repellent being present in a concentration in the neighborhood of about 1 percent, said synergist being present in a concentration in the neighborhood of about 3 percent, and said ammonium sulfate being present in an amount in the neighborhood of about 2 percent, the concentrations being expressed in weights percent.

7. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and ammonium persulfate in a quantity sufficient to extend effectively the life of the composition of the two first-mentioned compounds, said repellent being present in a concentration in the neighborhood of about 1 percent, said synergist being present in a concentration in the neighborhood of about 3 percent, and said ammonium persulfate being present in an amount in the neighborhood of about 2 percent, the concentrations being expressed in weights percent.

8. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and zinc borate in a quantity sufficient to extend effectively the life of the composition of the two first-mentioned compounds, said repellent being present in a concentration in the neighborhood of about 1 percent, said synergist being present in a concentration in the neighborhood of about 3 percent, and said zinc borate being present in an amount in the neighborhood of about 2 percent, the concentrations being expressed in weights percent.

9. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and sodium sulfate in a quantity sufficient to extend effectively the life of the composition of the two first-mentioned compounds, said repellent being present in a concentration in the neighborhood of about 1 percent, said synergist being present in a concentration in the neighborhood of about 3 percent, and said sodium sulfate being present in an amount in the neighborhood of about 2 percent, the concentrations being expressed in weights percent.

10. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and calcium chloride in a quantity sufficient to extend effectively the life of the composition of the two first-mentioned compounds, said repellent being present in a concentration in the neighborhood of about 1 percent, said synergist being present in a concentration in the neighborhood of about 3 percent, and said calcium chloride being present in an amount in the neighborhood of about 2 percent, the concentrations being expressed in weights percent.

11. An improved insect repellent composition having increased repellent life containing 2,3,4,5-bis($\Delta^2$-butenylene)tetrahydrofurfural as active repellent, N-2-ethylhexylbicyclo[2.2.1]-5-heptene-2,3-dicarboximide as a synergist for said repellent and sodium iodide in a quantity sufficient to extend effectively the life of the composition of the two first-mentioned compounds, said repellent being present in a concentration in the neighborhood of about 1 percent, said synergist being present in a concentration in the neighborhood of about 3 percent, and said sodium iodide being present in an amount in the neighborhood of about 2 percent, the concentrations being expressed in weights percent.

References Cited in the file of this patent

UNITED STATES PATENTS

| | | |
|---|---|---|
| 2,654,667 | Goodhue et al. | Oct. 6, 1953 |
| 2,757,120 | Leonard | July 31, 1956 |
| 2,824,822 | Goodhue et al. | Feb. 25, 1958 |
| 2,863,799 | Goodhue et al. | Dec. 9, 1958 |
| 2,884,355 | Goodhue et al. | Apr. 28, 1959 |
| 2,919,227 | Goodhue et al. | Dec. 29, 1959 |
| 2,926,118 | Mahan | Feb. 23, 1960 |
| 2,944,932 | Stansbury et al. | July 12, 1960 |
| 3,008,872 | Goodhue et al. | Nov. 14, 1961 |

OTHER REFERENCES

King: Chemicals Evaluated as Insecticides, Agriculture Handbook No. 69, issued May 1954, U.S. Govt. Printing Office, Washington, D.C., pages 101, 310 and 339.